United States Patent [19]

Slee

[11] Patent Number: 4,616,389
[45] Date of Patent: Oct. 14, 1986

[54] MANUFACTURE OF CAMSHAFTS

[75] Inventor: Roger H. Slee, Warwick, England

[73] Assignee: AE PLC, Warwickshire, England

[21] Appl. No.: 722,855

[22] Filed: Apr. 12, 1985

[30] Foreign Application Priority Data

Apr. 14, 1984 [GB] United Kingdom ............... 84 09771

[51] Int. Cl.$^4$ ..................... B23P 15/00; F16H 53/06; B22F 3/10; B22F 5/08
[52] U.S. Cl. ................... 29/156.4 R; 29/447; 29/467; 29/559; 29/DIG. 19; 29/DIG. 31; 29/DIG. 35; 72/377; 74/567; 74/569; 419/8; 419/28; 419/29; 419/61
[58] Field of Search ............... 29/156.4 R, 447, 467, 29/559, DIG. 19, DIG. 31, DIG. 35; 72/377; 74/53, 54, 55, 567, 569; 123/90.31; 419/8, 28, 29, 42, 49, 61, 68

[56] References Cited

U.S. PATENT DOCUMENTS

| | | | |
|---|---|---|---|
| 1,390,949 | 9/1921 | Yassenoff | 74/567 |
| 2,704,465 | 3/1955 | Haller | 74/567 X |
| 2,794,103 | 5/1957 | Moore et al. | 74/567 X |
| 2,892,254 | 6/1959 | Garvin | 29/467 X |
| 2,899,742 | 8/1959 | Wilson | 29/447 |
| 2,932,983 | 4/1960 | Laviana et al. | 74/567 |
| 3,222,772 | 12/1965 | Leyner | 29/447 |
| 3,962,772 | 6/1976 | Haller | 419/28 X |
| 3,999,277 | 12/1976 | Hamada | 29/447 |
| 4,438,555 | 3/1984 | Tsumuki | 74/567 X |

FOREIGN PATENT DOCUMENTS 2050207 1/1981 United Kingdom .

Primary Examiner—Howard N. Goldberg
Assistant Examiner—R. S. Wallace
Attorney, Agent, or Firm—Leydig, Voit & Mayer, Ltd.

[57] ABSTRACT

A camshaft is prepared from separately formed cams and a shaft. The cams may for example be formed by sintering. The cams are provided with holes which are under-sized and are provided with serrations. They are located on a correspondingly shaped dummy shaft in their required relative orientations and angular positions. Next, the cams are clamped in these positions and the dummy shaft removed. The cams are then heated to red heat and the serrated holes in them broached to bring them to their final size and to concentricity. Finally, a shaft having an exterior profile corresponding to the shape and size of the broached profile of the holes, at ambient temperature, is introduced into the holes and the cams are then cooled so that they shrink fit on to the shaft so ensuring that they are accurately positioned on the shaft. The cams are then released from the jig to give a finished camshaft.

7 Claims, 4 Drawing Figures

MANUFACTURE OF CAMSHAFTS

BACKGROUND OF THE INVENTION

1. Field of the Invention

The invention relates to the manufacture of camshafts for internal combustion engines.

A camshaft for an internal combustion engine has a shaft carrying a number of cams which have a required angular and axial inter-relationship. The cams have surfaces with a predetermined profile and have to be particularly wear-resistant, since they are repeatedly striking associated tappets. The traditional way of manufacturing camshafts is by casting or forging, but this can be timeconsuming and expensive.

2. Review of the Prior Art

A recent proposal has been to form the cams separately from the shafts and then connect them together. This allows the cams to be made from a first material and by a first technique and the shafts to be made from a different material and/or by a different technique. One example of this is where the cams are made of a sintered metal powder with a highly wear-resistant surface and where the shaft (which may be solid or may be a tube) is made from a less expensive material, such as a mild steel, machined or forged or extruded to shape.

Such camshafts have the problem, however, that the cams must be very accurately positioned on the shaft before they are connected to them and that their shaft-engaging holes must be truly concentric—because any out of concentricity will be reflected in an inaccurate positioning of the associated cam. Hitherto, it has been proposed to connect individually finished cams to a shaft by welding or by the use of pins passing through the cams into the shaft. These manufacturing methods can, however, be time-consuming or expensive and do not deal with the problem of concentricity.

SUMMARY OF THE INVENTION

According to a first aspect of the invention, there is provided a method of manufacturing a camshaft, comprising forming a plurality of cams separately from a shaft on which the cams are to be fixed, with each cam having a profiled shaft-engaging hole whose size is smaller than the required final size thereof, positioning the cams on a correspondingly profiled dummy shaft so that the cams have a required relative angular orientation and axial spacing, the profiles of the dummy shaft and the cams preventing relative angular movement therebetween, holding the positioned cams in a jig to maintain said required relative orientation and spacing, removing the dummy shaft, heating the cams and machining the holes to be concentric and of a precise final size and profile, inserting a correspondingly sized and profiled shaft through the machine holes and then cooling the cams to shrink the cams onto the shaft to fix the cams to the shaft in said required relative orientation and spacing.

The pre-positioning of the cams allows the holes to be machined to true concentricity with the cams in their final relative positions. When the shaft proper is inserted through these holes and the cams shrunk on to them, the cams are thus accurately positioned in all respects.

According to a second aspect of the invention, there is provided a camshaft when made by the method of the first aspect of the invention.

BRIEF DESCRIPTION OF THE DRAWINGS

The following is a more detailed description of one embodiment of the invention, by way of example, reference being made to the accompanying drawings in which.

DESCRIPTION OF THE PREFERRED EMBODIMENTS

Figure 1:
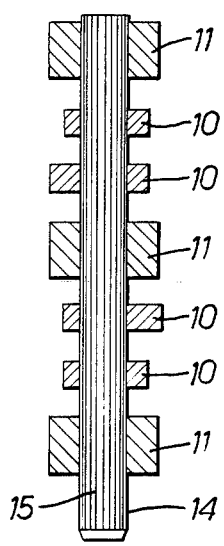
FIG. 1 is a section through an assembly of three bearing pieces and six cams mounted on a dummy shaft.
Figure 2:
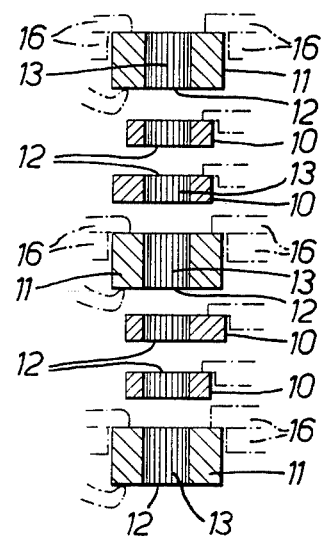
FIG. 2 is a section through the bearing pieces and cams of FIG. 1 held in a jig with the dummy shaft removed.

Referring first to FIG. 1, cams 10 and bearing pieces 11 are prepared separately. The cams 10 are formed from a suitable metal or metal alloy powder which is sintered by being heated and pressed in a die to produce a cam of a required external profile. Each cam is formed with a hole 12 having inwardly projecting serrations 13 (see FIG. 2) which extend in an axial direction and are angularly spaced around the associated hole 12. The serrations 13 may, for example, be to SAE specification J500. The size of the holes 12 and the serrations 13 is smaller than their required final depth. Because they are produced by sintering, the dimensions and shape of the holes cannot be very accurately controlled—although accuracy is required. Die wear will also contribute to variations in the hole dimensions and shape.

The bearing pieces 11 are prepared in any convenient way, for example, from steel powder by sintering or from wrought bar and are formed with similarly dimensioned holes 12 and serrations 13.

A dummy shaft 14 (FIG. 1) is then prepared which is provided with a serrated cross-sectional shape which is slightly smaller than the cross-sectional shape of the serrated holes 12 in the cams 10 and the bearing pieces 11. The dummy shaft 14 may be formed from a hard metallic or ceramic material by any suitable technique such as machining or extrusion or die-shaping. The dummy shaft 14 may be solid or a tube. The required number of cams 10 and bearing pieces 11, four cams and three bearing pieces in the embodiment shown, are then arranged on the dummy shaft 14 with the required axial spacing and, in the case of the cams, with the required relative angular orientation. The engagement between the serrations 13 on the cams 10 and the serrations 15 on the dummy shaft 14 prevents relative rotation therebetween. In this way, the cams 10 and the bearing pieces 11 are held in the same relative positions as is required in the finished camshaft.

It will be appreciated that although the cams and the dummy shaft described above have inter-engaging serrations 13, 15, the necessary inter-engagement between these parts, to allow relative axial movement but prevent any possibility of relative angular movement, may be provided by any suitable non-circular cross-section of the holes 12 and the dummy shaft 14. Serrations, however, have the benefit that, when at a suitably fine pitch, the relative angular positions of all the cams can be fixed very accurately and variations in these positions can be accommodated without alteration of the dummy shaft 14. In addition, the use of serrations permits optimum settlement of the metal powders in the dies during the sintering of the cams 10. This results in correct formation of the serrations and low stress concentrations.

Figure 3:
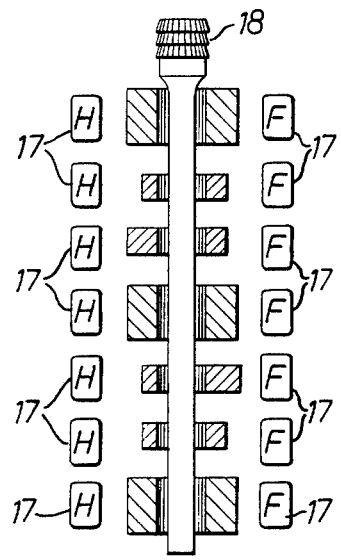
FIG. 3 is a similar view to FIG. 2 but with the cams and bearing pieces being heated and broached.
Figure 4:
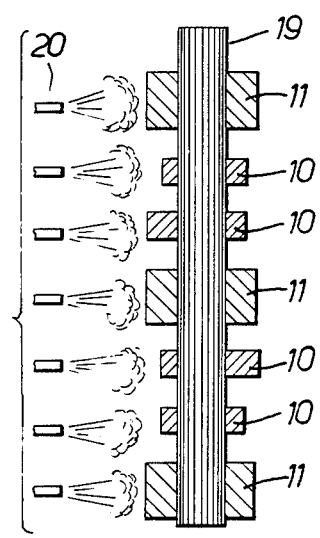
FIG. 4 shows the cams and bearing pieces of FIGS. 1 to 3 mounted on a shaft and air-cooled to shrink the cams and bearing pieces onto the shaft.

The cams 10 and bearing pieces 11, in the final relative positions on the dummy shaft 14, are then clamped in a jig 16 (FIG. 3). The dummy shaft 14 is then removed to leave the cams 10 and the bearing pieces 11 held in the jig 16.

The cams 10 and bearing pieces 11 are next heated to red heat (about 800° C.) by an electrical high frequency heating system 17 (see FIG. 3), (although any other suitable heating system may be used). This expands the cams 10 and the bearing pieces 11 and also facilitates the machining step now to be described.

The holes 12 in the cams 10 and bearing pieces 11 are then machined by means of a broaching tool 18 which is drawn axially through the holes 12. The broach 18 increases the depth of the serrations and also increases the diameter of the holes 12 to produce a required final profile and to ensure that all the holes 12 are truly axially aligned. This also ensures that the serrated holes 12 so formed are of accurate size for fitting onto a shaft in a manner to be described below, so removing variations caused by sintering and die wear.

Once machining of the red hot cams 10 and bearing pieces 11 has been completed, a shaft 19 (which may be solid or a tube) is inserted through the cams and bearing pieces. The shaft 19 is, for example, of mild steel and is formed by hobbing, extruding or die-forming with a serrated exterior profile which is fractionally larger than the profile of the cams 10 and bearing pieces 11, when at ambient temperatures. The cams 10 and bearing pieces 11 are then cooled, for example by air jets 20 (which may contain water droplets to speed cooling) so that they shrink on to the shaft 19 with an interference fit and so are firmly attached thereto. The cams 10 and bearing pieces 11 are then released from the jig 16. Because of their previous correct positioning of the dummy shaft and because of the accurate and concentric machining of the serrated holes, the cams 10 and bearing pieces 11 are thus very precisely fixed on the shaft 19 in their required axial and angular positions without excessive interference. The camshaft so produced can be ready for use without further processing.

I claim:

1. A method of manufacturing a camshaft, comprising forming a plurality of cams separately from a shaft on which the cams are to be fixed, with each cam having a profiled shaft-engaging hole whose size is smaller than the required final size thereof, positioning the cams on a correspondingly profiled dummy shaft so that the cams have a required relative angular orientation and axial spacing, the profiles of the dummy shaft and the cams preventing relative angular movement therebetween, holding the positioned cams in a jig to maintain said required relative orientation and spacing, removing the dummy shaft, heating the cams and machining the holes to be concentric and of a precise final size and profile, inserting a correspondingly sized and profiled shaft through the machine holes and then cooling the cams to shrink the cams onto the shaft to fix the cams to the shaft in said required relative orientation and spacing.

2. A method according to claim 1, wherein the profile of the cam holes, the dummy shaft and the shaft is a serrated profile, with the serrations extending axially.

3. A method according to claim 1, wherein the cams are formed from a sintered metal powder.

4. A method according to claim 1, wherein the heating of the cams is by an electrical high frequency heating process.

5. A method according to claim 1, wherein the machining step is a broaching step carried out while the cams are heated.

6. A method according to claim 1, wherein the cooling step is an air blast quench and includes a water droplet content.

7. A method according to claim 1 and further including connecting bearing pieces to the shaft by a method which is the same as the method of connection of the cams.

* * * * *